June 26, 1962 A. JURAS ETAL 3,041,131
COMPOSITE PLASTIC-METAL FIBER ARTICLES AND
METHOD FOR MAKING SAME
Filed Aug. 26, 1957 3 Sheets-Sheet 1
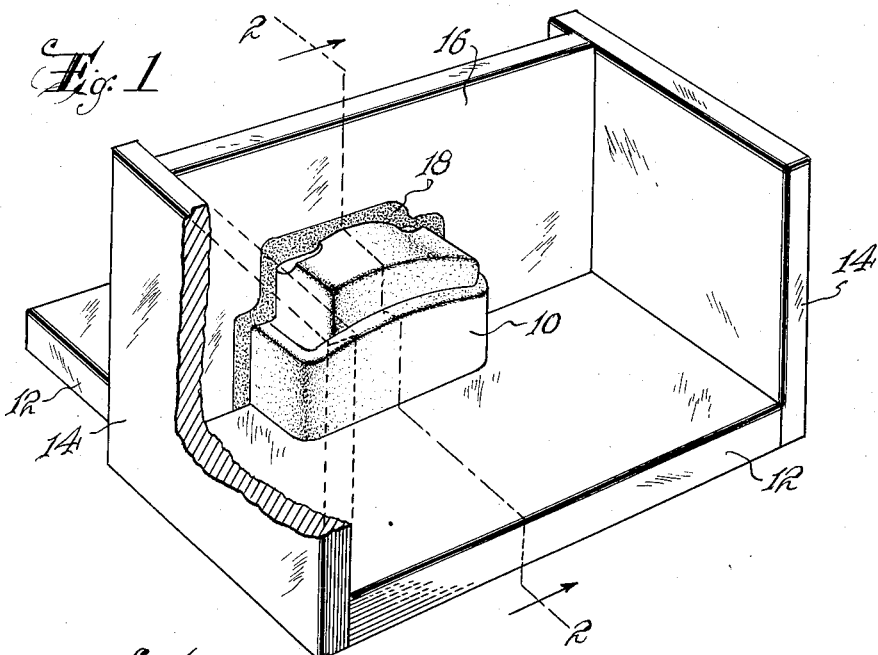
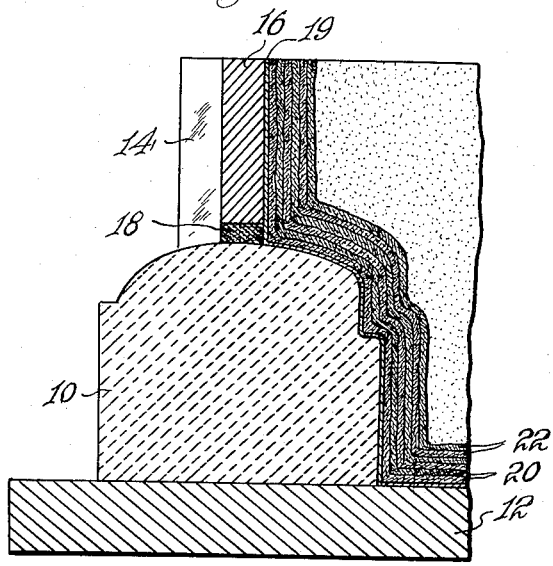
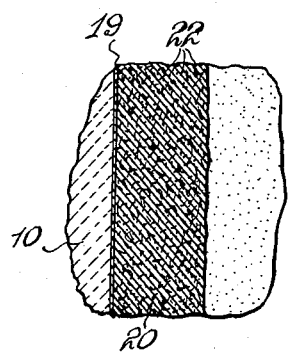
Inventors
Appy Juras
Arthur P. Mazzocchetti
Thomas E. Bugel
By Walter C. Kehm Attorney

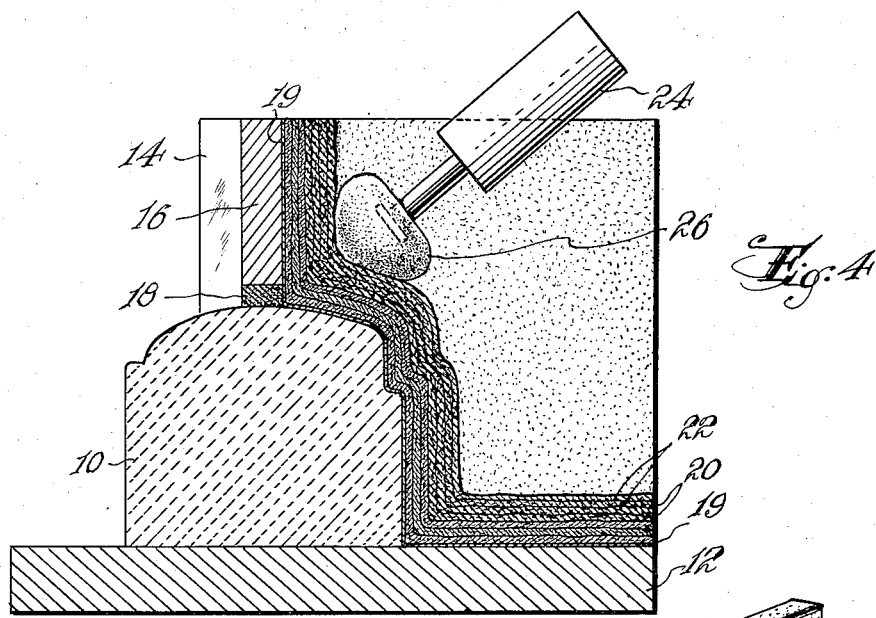
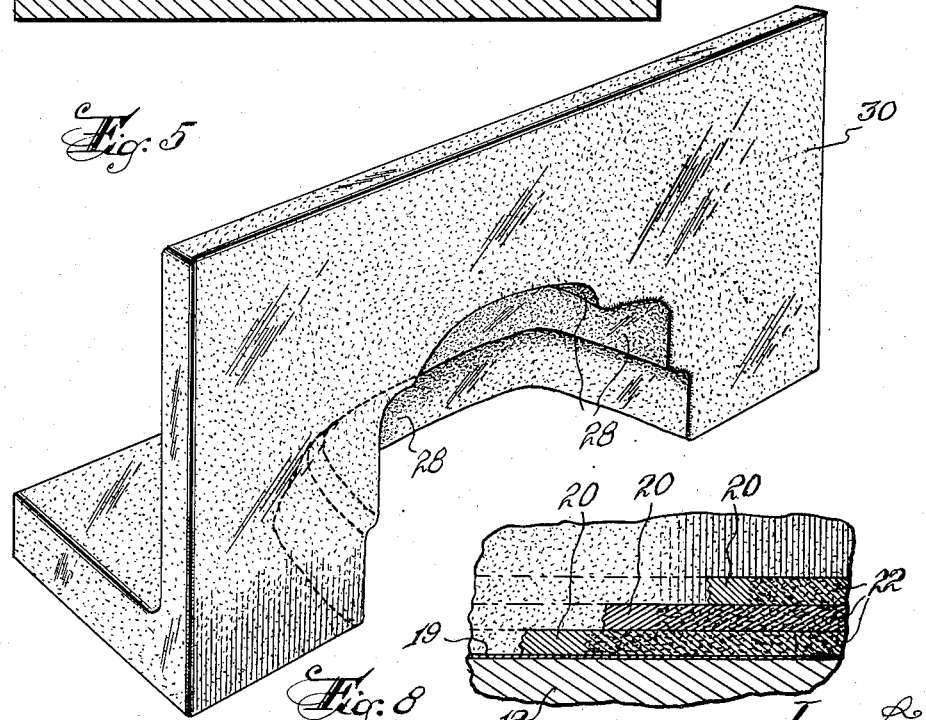

June 26, 1962 A. JURAS ETAL 3,041,131
COMPOSITE PLASTIC-METAL FIBER ARTICLES AND
METHOD FOR MAKING SAME
Filed Aug. 26, 1957 3 Sheets-Sheet 3

Inventors
Appy Juras
Arthur P. Mazzucchelli
Thomas E. Buget
By Walter C. Kehm Attorney United States Patent Office 3,041,131
Patented June 26, 1962

3,041,131
COMPOSITE PLASTIC-METAL FIBER ARTICLES
AND METHOD FOR MAKING SAME
Appy Juras, Detroit, Mich., and Arthur P. Mazzucchelli, Scotch Plains, and Thomas E. Bugel, Montclair, N.J., assignors to Union Carbide Corporation, a corporation of New York
Filed Aug. 26, 1957, Ser. No. 680,265
10 Claims. (Cl. 18—47)

This invention relates to novel composite plastic-metal fiber articles and to a novel method for making same. More especially, the present invention relates to articles of manufacture having a working surface, as hereinafter defined, comprising a surface layer of a suitable thermoset resin and short lengths of heat-conducting metallic material interspersed substantially homogeneously throughout said surface layer, and to a method for making said articles. Also, this invention more especially relates to a novel method for making such articles, wherein said surface layer is formed by causing the metallic material to be applied under pressure onto and within a suitable thermosetting resin-containing coating disposed on a formed surface to be simulated.

It has been realized that while various plastic compositions have many desirable properties, their use for a number of purposes has not been practicable because of certain inherent weaknesses of the plastic materials which have been used. As an example, we may mention the fact that it has been extremely difficult to cast or mold sound articles, e.g., cast or molded plastic dies and tools, with epoxy or polyester resins in thicknesses greater than about ½ inch, because of the high degree of exothermic heat generated in the interior of thick masses during the curing reaction, resulting in high internal stresses in the cast or molded objects.

In order to overcome the just-indicated disadvantages, and to reinforce the plastic, a suggestion has been made to incorporate steel or other heat-conducting metals in wool or fiber form into the resin, the resulting resin-metal fiber mixture then being cast to form an integral metal containing plastic die, etc.

While this suggestion has given advantageous results in many cases, it has been found that only limited success is attained, e.g., when articles having abrupt changes of wearing surface, such as edges and corners, are made in accordance therewith. It is believed that the reason for this lack of success is that the resiliency, i.e., springiness, of the metal wools and long fibers causes them to bridge over those places where the surface changes abruptly, such as at corners; and consequently the metallic material does not reach into the relatively inaccessible sections. The resulting absence of metal reinforcement then permits the resin to flow into the affected sections, thereby resulting in resin-rich or unsupported areas which are characterized, e.g., by lack of homogeneity in appearance and properties, and by the absence of the desired high impact resistance, thermal conductivity, and wear and abrasion resistance.

Accordingly, it is an object of the present invention to provide articles comprising metal fiber and plastic combinations with improved "working surfaces."

It is a further object of this invention to provide a novel method of forming such articles.

The foregoing objects, as well as others which will become apparent hereinafter, have been accomplished in accordance with this invention, wherein we provide a composite metal fiber-plastic article having a working surface which comprises a layer of a thermoset resin, and, interspersed homogeneously therethrough, short lengths of heat-conducting metallic material. The homogeneous dispersion of the metallic material is a uniform dispersion thereof in the resin and in which the metallic material is directionally randomly oriented, i.e. the longest dimensions of the particles of the metallic material are randomly oriented. In making the improved articles of this invention, we presently prefer to form the aforesaid layer by a process involving, essentially, forming a coating on a form having the surface or configuration to be simulated, spraying the metallic material in flock form onto and into said coating, and then causing the resulting interjoined combination of plastic material and shredded or flocked metal on said form to cure to a thermoset condition, either per se or, if desired, with other suitable "backing" materials, as such materials are hereinafter defined.

The resin employed in accordance with this invention as a component of the surface layer of the articles described herein is a thermosetting resin selected from the class consisting of epoxy resins and polyesters.

The epoxy resins of commerce today can be divided into two broad classes of resin: liquid resins and brittle solids resins.

Chemically, the two classes of epoxy resins are similar enough that a generalized formula can be written for both as follows:

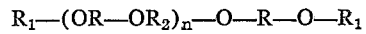

$$R_1\text{—}(OR\text{—}OR_2)_n\text{—}O\text{—}R\text{—}O\text{—}R_1$$

where R is the residue of a dihydric phenol, $R_2$ is an intermediate hydroxyl containing residue of a chlorohydrin or dichlorohydrin, and $R_1$ is mainly an epoxy-containing residue and to some extent a hydroxyl-containing residue derived from the chlorohydrin. In the above formula $n$ represents the extent of polymerization.

We regard as liquid epoxy resins or as low melting solid epoxy resins those having a value of $n$ from 0 to about 1. We regard as brittle solid epoxy resins those having a value of $n$ from about 2 to about 20.

The dihydric phenols used in making the epoxy resins may contain the hydroxy groups in one nucleus, as in resorcinol, or in different nuclei of either fused ring systems or ring systems connected by chains composed of one or more atoms. Illustrative of dihydric phenols which may be used in making the complex polymerization products are mononucleur phenols such as resorcinol, hydroquinone, phloroglucinol, etc., and polynuclear phenols such as bisphenol A [2,2-di(4-hydroxyphenyl)propane], p,p'-dihydroxy benzophenone, p,p'-dihydroxy diphenyl, p,p'-dihydroxy dibenzyl, and the like.

The difunctional or polyfunctional chlorohydrins used in making the epoxy resins include epichlorohydrin, glycerol, dichlorohydrin and the like.

The curing of epoxy resins may be divided into two classes—curing with hardeners and curing by catalysts. Hardeners are defined as polyfunctional compounds which are used with an epoxy resin in a stoichiometric or near stoichiometric ratio. Illustrative of hardeners are polyhydric phenols such as resorcinol; bisphenol A and the like; polybasic acids or their anhydrides such as maleic anhydride, phthalic anhydride, etc.; polyamines containing an active amino hydrogen such as ethylene diamine, diethylene diamine, etc.; polyhydric alcohols and polythiols. Catalysts are defined as compounds that cause the epoxy to self-polymerize. They may be monofunctional and are always used in much lower amounts than stoichiometric. Illustrative of catalysts are the amines, such as trimethyl amine, triethylamine, etc., alkalies and alkaline reacting substances, such as sodium or potassium hydroxide etc. boron trifluoride and a variety of others.

In addition to the liquid epoxy resins of the kind described, there have also been found suitable to our purpose the diepoxides such as those described in U.S.P. 2,716,123, 6 - methyl - 3,4 - epoxycyclohexylmethyl - 6 - methyl-3,4-epoxycyclohexane carboxylate, being illustrative.

The unsaturated polyester compositions suitable for our purpose are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalyst and activating agents will polymerize either at room temperature or by the application of heat and slight pressure to solid infusible plastic. The polymerization is exothermic and no volatile by-products are formed. Pure glycol maleate-styrene copolymer is rather brittle, but using longer glycols or by replacing part of the maleic acid with long chain aliphatic acids such as adipic acid a tougher and more flexible resin is obtained.

The vinyl monomer in the above compositions can be diallyl phthalate which is often used to cross-link the modified maleate polyester resins.

Suitable catalysts for unsaturated polyester compositions as above described are free radical initiators such as peroxides and azo compounds, such as benzoyl peroxide, tertiary butyl perbenzoate, methyl ethyl ketone peroxide and the like. Since most unsaturated polyester compositions are unstable on storage, they usually are marketed in the liquid form and contain a stabilizing inhibitor such as tertiary butyl catechol, hydroquinone and the like. The curing catalyst is then added just prior to the intended time of using the polyester compositions.

The metallic material used as part of the surface layer, in accordance with this invention, is not confined or limited to any particular metal or combination of metals. For applications where greatest surface strength and thermal conductivity are desired, those metals or combinations of metals, the fibers of which possess high tensile strength and thermal conductivity are preferred. At times, economic considerations will dictate the metal selected. Indeed, the general applicability of the present process, insofar as the operable metallic materials are concerned, is a special advantage as it renders our invention adaptable to special purposes, inasmuch as it permits the selection and use of those metal fibers which give the optimum properties for the use intended. For example, while the use of aluminum fibers is not indicated for making metal forming dies, its use is advantageous for heated matched molds intended for forming polyester fiberglass parts.

The metallic material comprises spun, extruded, cut or drawn filaments, either of round, rectangular, or other cross-sectional forms. The filaments may be smooth, rough, or crimped. Their lengths are appreciably greater than their cross-sectional dimensions. While the fiber size used in the surface layer herein is not critical in that precise limits are not essential to operable results, we doom it preferable to use fiber sizes between about $\frac{1}{32}$ inch and about $\frac{1}{2}$ inch, and desirably between about $\frac{1}{16}$ inch and about $\frac{1}{4}$ inch in length. The cross-sectional dimensions may also vary over wide limits, as an example, rod-like fibers having diameters between about 0.0005 inch and 0.025 inch or fibers having rectangular cross-sectional dimensions from about 0.010 inch x 0.002 inch to about 0.25 inch x 0.015 inch give the desired results.

Among the specific metallic materials which can be used we mention steel fibers, copper fibers, silver fibers, stainless steel fibers, nickel fibers and aluminum fibers, and alloys such as brass in fiber form. If desired, the metallic material may take the form of solid plastic or glass fibers to whose surfaces have been imparted, by dipping, spraying or similar means, a coat of a heat conducting medium, such as silver, aluminum or copper.

With respect to the aforesaid metallic fibers, it should be understood that they are not necessarily individual nor straight, but may be intertwined or interlocked. Indeed, irregularities or bends which may be present in the fibers as marketed are particularly advantageous, as they contribute to the greater holding ability of the resin. As an example of such materials, we mention steel wool or aluminum wool which has been reduced by chopping or other suitable means to the short lengths conforming to the foregoing specifications.

The proportion of metallic material and resin in the composition used to make the surface layer herein described may vary widely as long as sufficient metal is present to improve materially the thermal conductivity and other indicated properties of the surface layer, and as long as the proportion of resin is sufficient to knit the mass together upon curing to form a consolidated mass of good strength. In general, it has been found that at least 5 perecent by volume of the total volume of the composition referred to should comprise metallic material in order appreciably to improve the thermal conductivity, strength, impact resistance and other properties. In general, it has been found that at least 30 percent by volume of the total composition should comprise the resin. We prefer a range of metallic mtaerial from about 8 to about 20 percent, by volume, and a range of resin from about 80 to about 92 percent, on the same basis, when employing steel fibers. The corresponding ranges when aluminum fibers are used are from about 25 to about 50 percent of fiber and about 50 to about 75 percent resin.

It will be understood that, if desired, other materials may be used in addition to the aforementioned essential components in the surface layer of the articles herein described. Any suitable fillers or other substances may be used so long as they do not materially impair the desired properties of the resulting surface layers. Examples of such fillers include: stainless steel flake; iron or aluminum oxides; iron powder; fine silica; commercially available typical plastic tooling resins, compounded with or without fillers, for forming the working surfaces of plastic tools and dies.

The method we employ in order to make the plastic-metal fiber articles of this invention comprises the following steps, as aforesaid:

(a) Forming a coating with a thermosetting resin on that surface or those surfaces of a form having the configuration to be simulated;

(b) Applying the metallic fibrous material under pressure, e.g., by flocking onto said coating so that the metallic material penetrates the coating substantially throughout as well as covers the coating;

(c) Repeating steps (a) and (b) above, if desired, as many times as required to build the layer up to the desired thickness; and (d) Curing the interjoined combination of metal and resin to a thermoset condition, whereby the surfaces of the resulting thermoset article have assumed the exact configuration desired, i.e., the surface or surfaces of the form to be simulated.

In forming the coating noted in step (a) above, the epoxy resin or polyester resin, together with suitable catalysts, hardeners, or cross-linking agents required to cause said resin to cure to thermoset condition, is brushed or sprayed onto the surface of the form to be simulated. To expedite the hardening operation, the form and/or the resin may be preheated to an elevated temperature, e.g., 70° C., by any suitable means. This pre-heating treatment also may serve to make the resin fluid enough to transfer to the form if the resin is not liquid at room temperature.

The next step, i.e. (b) above, is conducted as soon as practicable following the formation of the just-referred to coating. This step involves the introduction of the metallic material into and onto the coating. We have found, and presently prefer, to introduce the metallic fibers by means of a procedure which is commonly referred to as flocking. This involves, essentially, spraying short lengths of the metallic material under air pressure onto and into the above noted coating. Sufficient pressure is employed to insure penetration of the metal fibers substantially throughout the coating. If desired, a mass of putty-like consistency may be made with the metallic fibers and resin and applied to the resin coating with a spreading tool, such as a trowel or putty knife; but this method is not preferred as it is costly and time consuming, as well as less efficient.

As already noted, steps (a) and (b) can be repeated as many times as may be necessary to build-up an article which has the desired thickness. Thus, the layer of resin having the metallic material uniformly dispersed and directionally randomly oriented therein can be formed by a single application of resin and metallic material or can be built up by the application of several coatings of resin, each having the metallic material dispersed therein. If desired, steps (a) and (b) can be employed simultaneously, i.e., the resin and the metal fibers can be applied at the same time, either together or separately.

One of the results of the process of applying the metallic fibers in accordance with this invention is that the fibers impart thixotropy to the resin coating, i.e., they inhibit the flow thereof, and thereby prevent "sagging" of the coating, avoiding unevenness of the film thickness. This is of special importance when so-called heat-resistant thermosetting resins are used.

It is to be noted that the surface layer as described herein, particularly after having been cured to its final thermoset condition, comprises the metallic fibers indiscriminately yet substantially homogeneously distributed throughout the resin in the layer. There necessarily is present a certain amount of interjoining and contacting of the fibers throughout the layer, a network of heat-conducting paths substantially to the exterior, i.e., the working surface of the composite, thereby resulting.

The desired thickness of the surface layer build-up will depend, among other factors, on the composition and nature of the articles made. For this reason no hard and fast instructions need or can be given which will be applicable to all cases. Subject to the foregoing, we can say that for so-called porous structures which are to be used in shell-like form a pre-cure thickness from about 1 to about 12 inches has been found to be satisfactory. For similar dense structures the corresponding thickness may be from about ¼ inch to about 6 inches. For those articles which are formed with "backing" materials, a pre-cure thickness of from about 1/32 inch to about ¼ inch has been found to be satisfactory. The criterion for determining the thickness of the pre-cure surface layer is that thickness which will enable the finished article to possess a working surface having the herein-stated desirable properties.

In general, it has been found that the cycle represented by steps (a) and (b), when repeated 2 or 3 times results in articles having the desired properties, but for some purposes there may be many such cycles employed. If desired, a complete die or mold can be made with the metal fiber-resin composite, without the use of any "backing" materials.

After the desired thickness has been built-up, the resulting composite is cured to a thermoset condition, either under atmospheric or superatmospheric pressure, either at room temperature or at elevated temperature, depending on the article desired and the actual composition of the metal fiber-resin composite. Examples of porous composites which may be made in this manner are light weight housings, structural panels (insulating or conducting), "sandwich" core for boat hulls, light weight molds for tooling work, prototype molds for vacuum forming, temporary shelters and decorative panels. In some cases, e.g., in making draw dies with reinforced plastic "backing" materials, a single cycle of steps (a) and (b) is sufficient.

To control further the density of the porous structures inorganic or organic blowing agents, e.g., sodium bicarbonate or parahydroxy phenylazide, may be incorporated in the resin.

In the event a more dense composite is desired, the built-up metal fiber-resin composite is compacted prior to being cured. The densification may be effected by any suitable means capable of being directed to the various corners and recesses of the form, as well as the surfaces and edges, for example, by an air or electrically-actuated impacting gun, preferably one having a soft tip which conforms to the configuration desired and which will minimize stresses on the form. It is understood that all that needs to be done in the densification step is to cause the gun, or other means employed, such as the bag molding method, to press the top surface of the metal fiber-resin composite against the form, thereby reducing the thickness of the composite.

Examples of articles which are suitably compacted include checking fixtures, housings, jigs, assembly fixtures, boat hull molds, heated bonding fixtures, etc.

In the event it is desired to construct a mold or die having an external working surface layer made in accordance with the present invention, the surface layer may be built up by use of a female mold as the forming device; then the balance of the space in the mold cavity may be filled by any suitable "backing" material, and the resulting mass may be placed under pressure, e.g., from about 20–300 pounds per square inch, slowly applied through a period sufficient to cause consolidation of the mass. Curing is allowed to take place under adiabatic conditions for a few hours, the pressure being maintained throughout this cure. The entire casting may then be clamped and, unless it is a large one, e.g. of the order of 1 cubic foot or more, it is retained under pressure and given a post cure, at an elevated temperature between about 140° F., and about 300° F., for from about 4 hours to about 24 hours, until the resin-metal fibers mass has set to a consolidated thermoset condition. The casting is then permitted to cool to about room temperature prior to being removed from the mold.

In the event the desired article has an internal working surface, it can be made by forming the composite of this invention, i.e., by following the aforementioned steps (a) and (b), a male punch having the desired configuration on its forming surface being employed as the mold. After the composite has been constructed in accordance with the foregoing, a suitable mold box is placed around the composite surrounding the male punch, the thereby-formed cavity is then filled with suitable "backing" material, and the cure effected as in the case of the forming of the article with the external working surface.

The unique versatility of the present process is additionally demonstrated by the fact that matching male punch and female die composites of this invention may be used together in the manner well-known to the molding industry to form molded objects such as trays, etc., for stamping metal parts.

Articles with "backing" materials made in accordance with this invention are many. They include tooling applications such as metal forming draw dies, heated dies for making fiberglass reinforced plastic laminates, molds for bag molding fiberglass reinforced plastic laminates, foundry patterns, core boxes, vacuum form molds, the shaping of thermoplastic sheet materials, jigs and other structures.

As used herein in the specification, including the claims, the term "working surface" refers, wherever the context so admits or requires, to that surface or surfaces of the articles made according to this invention which gives or give the desired form to articles made therefrom, in the case of dies, punches, molds, etc. or which are employed for purposes of checking fixtures, etc. in the case of shell-like composites.

The term "backing" material, as used herein, is intended to cover all that part or parts of articles made in accordance with the present invention, wherever the context so admits or requires, which do not involve a "working surface" as herein defined. Examples of "backing" materials include wood, reinforced plastic, welded metal or other type egg crate structures, any moldable plastic material, mixtures of plastics, e.g. epoxy and polyester resins and unwoven metallic filaments, foamed plastics, and plastic-fiberglass compositions.

All of the articles made in accordance with this invention are characterized by the fact that their "working surface" or surfaces, including those sections where there are abrupt changes of surface, are smooth, hard, uniform in properties, accurately conform to the desired configuration, have high impact-, wear- and abrasion-resistance, high thermal conductivity and dimensional rigidity or stability. Those composites which are shell-like may be dense or relatively porous, depending on whether there has been compacting or not, as aforesaid.

In order further to illustrate our invention the following detailed description taken in connection with the accompanying drawings, in which like numbers represent like parts throughout, and which form a part hereof, is given.

In the drawings:

FIG. 1 is an isometric view, partly broken away, showing a terminal stamping fixture whose surface is to be simulated by a preferred embodiment of this invention;

FIG. 2 is a part cross-section, taken along the line 2—2 of FIG. 1, showing, for purposes of understanding the present invention, several layers of resin-metal fiber covering the surface of the stamping fixture to be simulated as well as the template and base;

FIG. 3 is an enlarged, fragmentary view showing that the layers noted in FIG. 2 comprise in fact a substantially homogeneous layer;

FIG. 4 is similar to FIG. 2 and shows a compacting gun used in densifying the layers;

FIG. 5 shows the finished terminal box stamping checking fixture made in accordance with this invention from the fixture of FIG. 1;

FIG. 8 is an enlarged, fragmentary view showing the sequence of steps employed in building up the surface layer in accordance with our invention.

EXAMPLE I

Preparation of a Checking Fixture

Figure 6:
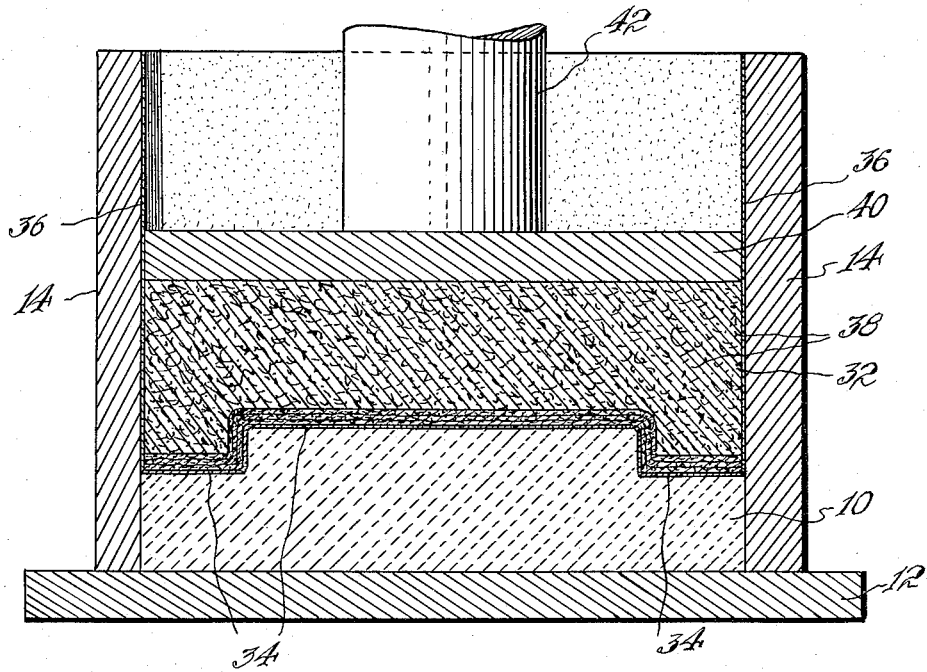
FIG. 6 is a partial, vertical section of apparatus and materials used in making another embodiment of our invention.

With reference to FIG. 1, a wooden die model or pattern 10, having a configuration corresponding to that of the articles to be checked, in this case terminal box stampings, by the "working surface" of the fixture made in accordance with our invention, is secured to a suitable base 12. If desired, the pattern 10 may be made of hemp-reinforced plaster, cast phenolic resin or epoxy or polyester laminate.

A mold build-up, defining the dimensions of the tool to be made, is next constructed with walls 14. A template 16 is then anchored in place so as to bisect the pattern 10 vertically and longitudinally, a thermosetting resin, such as a suitably catalyzed epoxy resin 18, e.g., diglycidyl ether of bisphenol A with diethylenetriamine hardener, being applied to anchor the template 16 to the pattern 10. Any excess of resin is removed after hardening by grinding flush with the template 16. A suitable parting agent or mold release agent, such as a silicone base material, e.g., that sold by Chemical Development Corp. under the designation, CD-B2, is then applied to all parting surfaces of the pattern 10, walls 14 and template 16, as shown in FIG. 2, leaving a 1-2 mil coating 19.

A 0.020" thick coating 20 of epoxy resin having the composition hereinafter noted is brushed or sprayed over the parting agent on the template, pattern and base as shown in FIG. 2.

The composition of the epoxy resin was as follows:

100 parts by weight of a fluid, polymerizable epoxy resin (ERL–2774, Bakelite Company).

19 parts by weight of a hardener such as a eutectic mixture of 57 parts by weight of metaphenylenediamine, 37 parts of bisaniline F and 6 parts of bisphenol A (ZZLA–0801, Bakelite Company).

5 parts by weight of a finely ground filler, e.g., silica powder.

Steel fibers 22 having lengths within the range from about $\frac{1}{32}''$ to about $\frac{5}{16}''$ are then flocked onto and into the coating 20, causing the coating 20 to become interspersed with the fibers 22 as shown in FIG. 3. The alternate application of resin and metal fibers is continued until a thickness of about $\frac{1}{2}''$ is built-up. There results a substantially homogeneous metal fiber-resin coating, as illustrated in FIG. 3.

The resin-fiber layer is then impacted with an air impacting gun 24 having a soft tip 26 conforming generally to the detail of the pattern FIG. 4. If desired, heat may be applied after each or several metal flocking cycles in order to expedite the formation of a self-supporting strong structure.

The entire assembly is permitted to harden under adiabatic conditions for 12 hours and is then given a post-cure for 2 hours at 100° C., followed by 4 hours at 150° C. The working surface 28 of the resulting terminal box stamping checking fixture 30 (FIG. 5) conforms to the configuration of the terminal box stampings to be checked therewith, is hard, thermally conducting, has high impact strength and has all the other desirable features noted hereinabove with respect to the articles of this invention. The fixture 30 has the following composition: 8 percent by volume of metal fiber, and the balance is resin and resin filler.

EXAMPLE II

Preparation of a Rectangular Checking Fixture

A mahogany panel having a cavity 10" x 10" x $\frac{1}{2}$" was treated with a solution of polyvinyl alcohol (Kotol) as a parting agent, allowed to dry over night and then coated with wax (Simoniz). During a period of 10 minutes a coating of the following composition was applied by brushing it onto the interior surface of the cavity:

100 grams of epoxy resin, ERL–2774.
26 grams of hydroxyethyldiethylene triamine (ZZLB–0814, Bakelite Company).
59 grams of aluminum powder.

Aluminum fibers ($\frac{1}{4}''$) were flocked onto the resin coating under an air pressure of 80 pounds per square inch, using a DeVilbiss metal flock gun, Type GBH. A resin composition was then sprayed onto the resulting resin-aluminum build-up under 50 pounds per square inch pressure. The composition of the resin was as follows:

100 parts by volume of ERL–2774.
65 parts by volume of ZZLB–0814 in a 50% solution by weight with alcohol.

The epoxy resin was applied at a temperature of 180° F. and the hardener (ZZLB–0814) was applied at a temperature of 75° F., using a De Vilbiss resin catalyst gun, Type 56C. The rate of delivery of the epoxy resin was 150 cc. per minute and that of the hardener was 97.5 cc. per minute to the mixing and spraying head of the gun.

Six alternate resin and aluminum flock layers were sprayed to a build-up of about $\frac{1}{8}''$ in 14 minutes and the build-up was then impacted with an air hammer for 10 minutes. Eleven additional alternate layers were then sprayed onto the resulting build-up, which was impacted again for 5–10 minutes. After seven more alternate cycles of spraying and metal flocking in 10 minutes, followed by the simultaneous spraying of resin and metal continuously for 2 minutes, the build-up was impacted once again and the entire system was allowed to stand for 20 minutes. The presence of exothermic heat was noted and impacting was continued for 10 minutes again.

After permitting the entire system to stand at room temperature for 24 hours the fixture was removed from the pattern. The fixture weighed 1917 grams and the "working surface" conformed exactly to the configuration and size of the cavity of the mahogany pattern, was smooth, strong, etc., having the aforementioned desirable properties of articles made in accordance with this invention.

EXAMPLE III

*Preparation of a Die*

Figure 7:
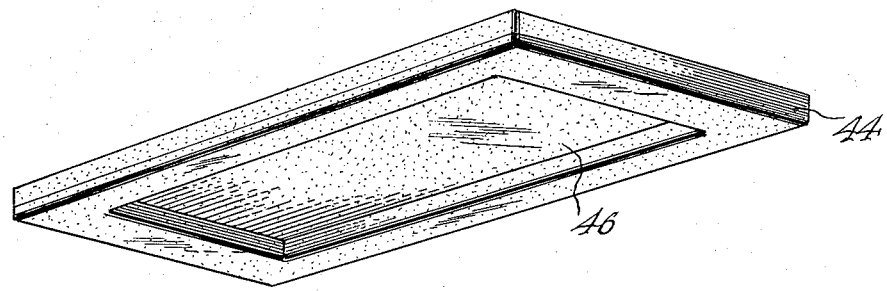
FIG. 7 is a die made from the apparatus and materials shown in FIG. 6.

The accompanying drawings, FIGS. 6 and 7, illustrate the making of a die in accordance with this invention.

The pattern 10 which was 4 inches thick is secured to a base 12 and mold side walls 14 as set forth in Example I. The materials for the pattern, base and side walls are the same as before. The cavity 32 is 4–6 times the casting thickness desired and the system was insulated against heat loss by radiation.

All of the surfaces defining the cavity 32, i.e. the surface 34 of the pattern to be simulated and the interior surfaces 36 of the mold side walls 14 are twice coated with a suitable mold release agent such as a silicone base agent, to a thickness of about 0.001".

The surfaces 36 of the side walls are given a primer coating of 1–3 mls. with a rubber paint, such as that marketed by U. S. Stoneware Co., and cured for 1 hour at 75° C.

The pattern and side mold surfaces 34 and 36 are then given a second coating of a silicone release agent.

A coating of about 1/32" thickness of epoxy resin composition such as the first such composition set forth in Example I was applied to the surface 34 of the pattern 10 by brushing. Steel wool fibers, 1/32" to 1/16" long were then applied with a suitable flocking gun, e.g., that used in accordance with Example II, until the coating of the base epoxy resin was hidden. The system was subjected to a temperature of 75° C. until the resin-metal fiber layer became changed from a very soft to a tacky state.

The cavity 32 was filled with a composition comprising 15–17% by volume of steel wool fibers (2" in length) and about 84 percent by volume of a resin formulation consisting of 100 parts by weight of the herein aforementioned diglycidyl ether of bisphenol A and 19 parts of ZZLA-0801. The steel wool 38 was first pre-saturated with the resin prior to introduction into the cavity 32 into which the aforementioned resin formulation had been introduced. A pressure plug 40 made from a 3/4" thick steel plate or hardwood faced with aluminum plate was inserted on top of the entire charge in the mold, and a pressure of about 300 p.s.i. was slowly applied by means of a ram 42 for about 30 minutes. Curing was allowed to take place under adiabatic conditions for about 6 hours, the pressure being maintained throughout this cure. The casting 44 was removed from the pressure ram 42 and clamped so as to retain it under pressure and then post cured in an oven for 6 hours at 140° F., then for 3 hours at 140° F.–300° F., and finally for 6 hours at 300° F. The casting 44 was then allowed to cool to room temperature and then removed from the mold assembly.

The final casting 44 (FIG. 7) had a "working surface" 46 which possessed the aforementioned desirable properties of articles made in accordance with this invention. It was suitable for use as a die, per se, to form molded articles having a surface conforming to surface 46. If desired, the casting 44 can be used in conjunction with a matched male punch (not shown) or with two rectangular blocks, one a solid and the other having a cavity, e.g. 9" x 2" x 1/2" to form articles, such as trays, or other shaped articles like tensile bars, having the form of the opening between the matched punch and die or matched blocks, in accordance with normal molding practice.

In place of the steel wool fibers employed in the "backing" material in accordance with Example III chopped glass roving (1 1/4"–2" in length) can be used. In such case, the amount of glass roving comprises 30–50 percent by volume of the total fiber-resin formulation instead of the 15–17 percent used in the case of steel wool fibers. Also, pressures as low as 20 pounds per square inch can be used.

While we have described our invention in detail in its preferred embodiments, it will be obvious to those skilled in the art, after understanding our invention, that various changes and modifications may be made herein without departing from the spirit or scope thereof. We aim in the appended claims to cover all such modifications and changes.

We claim:

1. An article of manufacture having a working surface having abrupt changes of contour, said working surface comprising a formed surface layer of a thermoset resin and dispersed in random direction throughout said thermoset resin, short lengths of heat-conducting fine metal fibers of a length less than that sufficient to bridge across the abrupt changes of contour of the working surface, said resin being selected from the group consisting of epoxy and polyester resins, and said surface layer being smooth, hard, and uniform in properties and having high impact resistance, high thermal conductivity, high dimensional stability and high resistance to wear and abrasion.

2. The article as set forth in claim 1 wherein the thermoset resin is an epoxy resin.

3. The article as set forth in claim 1 wherein said fine metal fibers are selected from the group of round fibers having diameters between 0.0005 inch and 0.025 inch and fibers having rectangular cross-sectional dimensions from about 0.01 inch x 0.002 inch to about 0.25 inch x 0.015 inch.

4. An article of manufacture having a working surface having abrupt changes of contour, said working surface comprising a formed surface layer accurately defining the abrupt changes of contour, of a thermoset epoxy resin and dispersed in random direction throughout said resin, heat-conducting fine metal fibers of a length between about 1/32 and 1/2 inch, said length being less than that sufficient to bridge across the abrupt changes of contour of the working surface and said fibers present in amounts wherein the metal fibers comprise at least about 5 percent by volume of the total volume of the said surface layer, and said surface layer being smooth, hard and uniform in properties and having high impact resistance, high thermal conductivity, high dimensional stability and high resistance to wear and abrasion.

5. The article as set forth in claim 4 wherein the metal fibers are steel fibers selected from the group of round fibers having diameters between 0.0005 inch and 0.025 inch and fibers having rectangular cross-sectional dimensions from about 0.01 inch x 0.002 inch to about 0.25 inch x 0.015 inch.

6. The article as set forth in claim 4 wherein the metal fibers are aluminum fibers selected from the group of round fibers having diameters between 0.0005 inch and 0.025 inch and fibers having rectangular cross-sectional dimensions from about 0.01 inch x 0.002 inch to about 0.25 inch x 0.015 inch.

7. A method for making an article of manufacture having a working surface having abrupt changes of contour and which surface is hard, smooth, and uniform in properties and has high thermal conductivity, high impact resistance, and high resistance to wear and abrasion which comprises depositing on a pattern having a surface to be simulated, a layer of a thermosetting resin and short lengths of heat-conducting fine metal fibers of a length less than that sufficient to bridge across the abrupt changes of contour of the pattern surface, and dispersing said fine metal fibers in random direction throughout the said thermosetting resin, said thermosetting resin being selected from the group consisting of epoxy and polyester resins, placing a backing material in contact with said layer and compressing the said layer into a consolidated mass and thereafter curing the said thermosetting resin.

8. A method for making an article of manufacture as described in claim 7 wherein the thermosetting resin and the metal fibers are simultaneously sprayed onto the pattern.

9. A method for making an article of manufacture as described in claim 7 wherein the thermosetting resin and metal fibers are alternately sprayed onto the pattern.

10. A method for making an article of manufacture having a working surface having abrupt changes of contour and which surface is hard, smooth and uniform in properties and has high thermal conductivity, high impact resistance and high resistance to abrasion and wear which comprises spraying onto a pattern having a surface to be simulated, a layer of a thermosetting epoxy resin and fine heat-conducting metal fibers of a length between about 1/32 inch to about 1/2 inch, said length being less than that sufficient to bridge across the abrupt changes of contour said fibers being present in amounts wherein the metal fibers comprise at least about 5 percent by volume of the said layer and dispersing said fine metal fibers in random direction throughout the epoxy resin, placing a backing material in contact with said layer and compressing said layer into a consolidated mass and thereafter curing the epoxy resin under pressure.

References Cited in the file of this patent

UNITED STATES PATENTS

| | | |
|---|---|---|
| 1,895,711 | Foley | Jan. 31, 1933 |
| 1,920,139 | Crosby | July 25, 1933 |
| 2,189,154 | Stewart | Feb. 6, 1940 |
| 2,230,127 | Basler | Jan. 28, 1941 |
| 2,441,548 | Sperry | May 11, 1948 |
| 2,477,468 | Saffir | July 26, 1949 |
| 2,632,922 | Kish | Mar. 31, 1953 |
| 2,706,832 | Frost et al. | Apr. 26, 1955 |
| 2,781,549 | Milne | Feb. 19, 1957 |
| 2,784,630 | Koprow et al. | Mar. 12, 1957 |
| 2,786,007 | Chew | Mar. 19, 1957 |
| 2,901,455 | Jurras | Aug. 25, 1959 |

FOREIGN PATENTS

| | | |
|---|---|---|
| 133,819 | Australia | July 15, 1946 |
| 1,095,454 | France | June 3, 1955 |

OTHER REFERENCES

McAfee: "Use of Epoxy Resin as Pattern Material, "Trans. of the American Foundryman's Society, vol. 64, May 3–9, 1956, pages 504–508.